(12) United States Patent
Huebner et al.

(10) Patent No.: US 11,821,619 B1
(45) Date of Patent: Nov. 21, 2023

(54) LIGHTING FIXTURE AND CEILING SYSTEM WITH INTEGRATED LIGHT FIXTURE

(71) Applicant: Plascore, Inc., Zeeland, MI (US)

(72) Inventors: Fritz Huebner, Holland, MI (US); Brian Vennix, Hudsonville, MI (US); David Mosley, Grand Rapids, MI (US); Carl Bosch, Hamilton, MI (US)

(73) Assignee: Plascore, Inc., Zeeland, MI (US)

( * ) Notice: Subject to any disclaimer, the term of this patent is extended or adjusted under 35 U.S.C. 154(b) by 0 days.

(21) Appl. No.: 17/752,116

(22) Filed: May 24, 2022

(51) Int. Cl.
*F21V 33/00* (2006.01)
*F21S 8/04* (2006.01)
*F21V 27/00* (2006.01)
*F21Y 115/10* (2016.01)

(52) U.S. Cl.
CPC ............ *F21V 33/006* (2013.01); *F21S 8/043* (2013.01); *F21S 8/046* (2013.01); *F21V 27/00* (2013.01); *F21Y 2115/10* (2016.08)

(58) Field of Classification Search
CPC . F21S 8/026; F21S 8/043; F21S 8/046; F21V 33/006; F21V 27/00; F21Y 2115/10
See application file for complete search history.

(56) References Cited

U.S. PATENT DOCUMENTS

| | | | |
|---|---|---|---|
| 9,897,305 B2 | 2/2018 | Ryder et al. | |
| 10,113,724 B2 | 10/2018 | Satterfield et al. | |
| 10,151,462 B1 | 12/2018 | Satterfield et al. | |
| 10,584,866 B2 | 3/2020 | Ryder et al. | |
| 2018/0209601 A1 * | 7/2018 | Doubek | F21V 7/0008 |
| 2018/0320840 A1 * | 11/2018 | Machlis | F21V 17/002 |
| 2019/0170341 A1 | 6/2019 | Lax et al. | |
| 2019/0186718 A1 * | 6/2019 | Spiro | F16L 3/06 |
| 2020/0200379 A1 | 6/2020 | Ryder et al. | |

FOREIGN PATENT DOCUMENTS

EP          3865760 A1 *   8/2021

* cited by examiner

*Primary Examiner* — Anabel Ton
(74) *Attorney, Agent, or Firm* — Price Heneveld LLP

(57) ABSTRACT

A walkable ceiling system is provided that includes ceiling panels each having opposed first and second edges and opposed third and fourth edges. The ceiling panels are arranged in a grid pattern where the third edge of a ceiling panel abuts the fourth edge of an adjacent ceiling panel and the first edge of a ceiling panel is spaced apart from the second edge of an adjacent panel. A plurality of turnbuckle assemblies each include a plate secured to corners of four adjacent ceiling panels, and a turnbuckle secured to the plate for suspending the ceiling panels. The light fixtures include: a lens attached to the first edge of a ceiling panel and second edge of an adjacent ceiling panel; a top plate secured to adjacent ceiling panels; a wiring raceway attached to the top plate; and LEDs attached to the wiring raceway for projecting light through the lens.

22 Claims, 12 Drawing Sheets

LIGHTING FIXTURE AND CEILING SYSTEM WITH INTEGRATED LIGHT FIXTURE

BACKGROUND OF THE INVENTION

The present invention is generally directed to a lighting fixture for integrating into a ceiling system and, more specifically, to a ceiling system with an integrated light fixture that is walkable and suitable for use in a clean room.

Suspended walkable ceiling systems have been designed for use in clean rooms. Examples are found in U.S. Pat. Nos. 9,897,305; 10,113,724; 10,151,462; and 10,584,866.

SUMMARY OF THE INVENTION

According to one embodiment of the present invention, a walkable ceiling system comprising: a plurality of ceiling panels each having opposed first and second edges and opposed third and fourth edges, wherein the plurality of ceiling panels are arranged in a grid pattern such that the third edge of a ceiling panel abuts the fourth edge of an adjacent ceiling panel and the first edge of a ceiling panel is parallel to and spaced apart from the second edge of an adjacent panel; a plurality of turnbuckle assemblies each having a plate secured to corners of four adjacent ceiling panels, and a turnbuckle secured to the plate for attachment to a hanger for suspending the ceiling panels; and a plurality of light fixtures positioned between the first edge of a ceiling panel and second edge of an adjacent ceiling panel. Each light fixture comprising: a lens attached between the first edge of a ceiling panel and second edge of an adjacent ceiling panel at a location proximate bottom surfaces of the ceiling panels; a top plate secured to upper surfaces of adjacent ceiling panels to thereby secure adjacent ceiling panels to one another; a wiring raceway attached to a bottom surface of the top plate; and LEDs attached to a bottom surface of the wiring raceway for projecting light from between adjacent panels through the lens.

According to another embodiment of the present invention, a walkable ceiling system comprising: a plurality of ceiling panels each having opposed first and second edges and opposed third and fourth edges, wherein the plurality of ceiling panels are arranged in a grid pattern such that the third edge of a ceiling panel abuts the fourth edge of an adjacent ceiling panel and the first edge of a ceiling panel is parallel to and spaced apart from the second edge of an adjacent panel; and a plurality of light fixtures positioned between the first edge of a ceiling panel and second edge of an adjacent ceiling panel. Each light fixture comprising: a lens attached to the first edge of a ceiling panel and second edge of an adjacent ceiling panel at a location proximate bottom surfaces of the ceiling panels; a top plate secured to upper surfaces of adjacent ceiling panels; a wiring raceway attached to a bottom surface of the top plate; a plurality of light sources attached to a bottom surface of the wiring raceway for projecting light from between adjacent panels through the lens; and an access panel formed in the top plate to allow access to the wiring raceway through the top plate.

According to still another embodiment of the present invention, a light fixture for a walkable ceiling system having a plurality of ceiling panels each having opposed first and second edges and opposed third and fourth edges, wherein the plurality of ceiling panels are arranged in a grid pattern such that the third edge of a ceiling panel abuts the fourth edge of an adjacent ceiling panel and the first edge of a ceiling panel is parallel to and spaced apart from the second edge of an adjacent panel, the light fixture comprising: a lens comprising a horizontal member and a pair of opposing resilient sides extending upward from the horizontal member, the pair of opposing resilient sides including a first resilient side configured for attachment to the first edge of a ceiling panel and a second resilient side configured for attachment to the second edge of an adjacent ceiling panel, the horizontal member extending at a location proximate the bottom surfaces of the ceiling panels; a top plate configured to be secured to upper surfaces of adjacent ceiling panels; a wiring raceway attached to a bottom surface of the top plate; and a plurality of light sources attached to a bottom surface of the wiring raceway for projecting light from between adjacent panels through the lens.

According to still another embodiment of the present invention, a method of assembling a walkable ceiling system, the method comprising: providing a plurality of ceiling panels each having opposed first and second edges and opposed third and fourth edges; providing a plurality of turnbuckle assemblies each having a plate and a turnbuckle secured to the plate for attachment to a hanger; attaching a plate of a turnbuckle assembly to each corner of a ceiling panel; suspending the ceiling panel by the hangers of the attached turnbuckle assemblies; attaching adjacent ceiling panels to the plates of turnbuckle assemblies and suspending the adjacent ceiling panels such that the plurality of ceiling panels are arranged in a grid pattern such that the third edge of a ceiling panel abuts the fourth edge of an adjacent ceiling panel and the first edge of a ceiling panel is parallel to and spaced apart from the second edge of an adjacent panel, and such that the plate of a turnbuckle assembly is attached to the corners of four adjacent ceiling panels; providing a plurality of light fixtures; and after the ceiling panels are suspended, attaching the light fixtures between the first edges of the ceiling panels and the second edges of the adjacent panels.

These and other features, advantages and objects of the present invention will be further understood and appreciated by those skilled in the art by reference to the following specification, claims and appended drawings.

Figure 1:
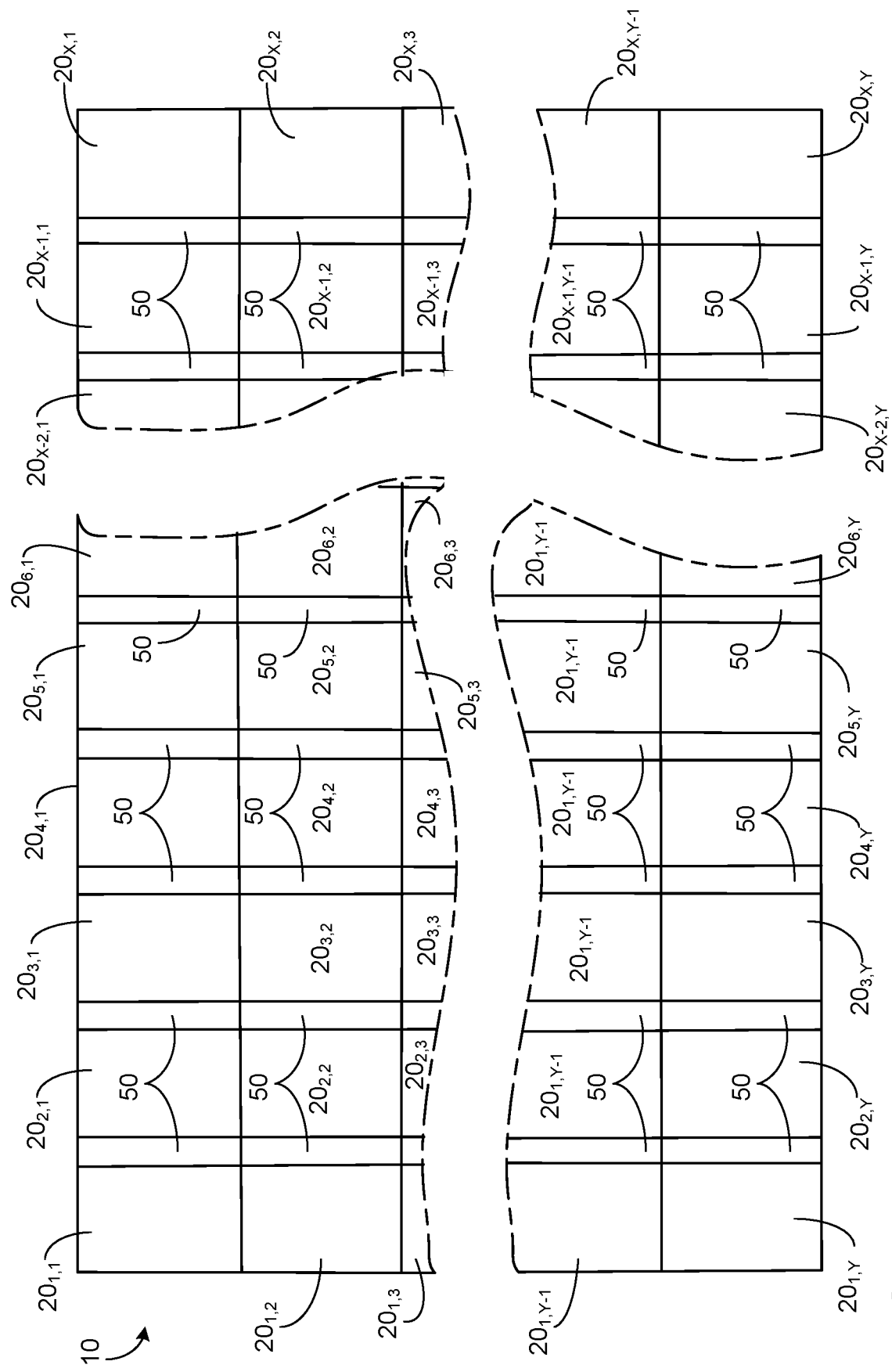
FIG. 1 is a broken bottom view of a walkable ceiling system according to one embodiment.

The components in the figures are not necessarily to scale, emphasis instead being placed upon illustrating the principles described herein.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, other physical characteristics relating to the embodiments disclosed herein are not to be considered as limiting, unless the claims expressly state otherwise.

The present illustrated embodiments reside primarily in combinations of method steps and apparatus components related to a walkable ceiling system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 3:
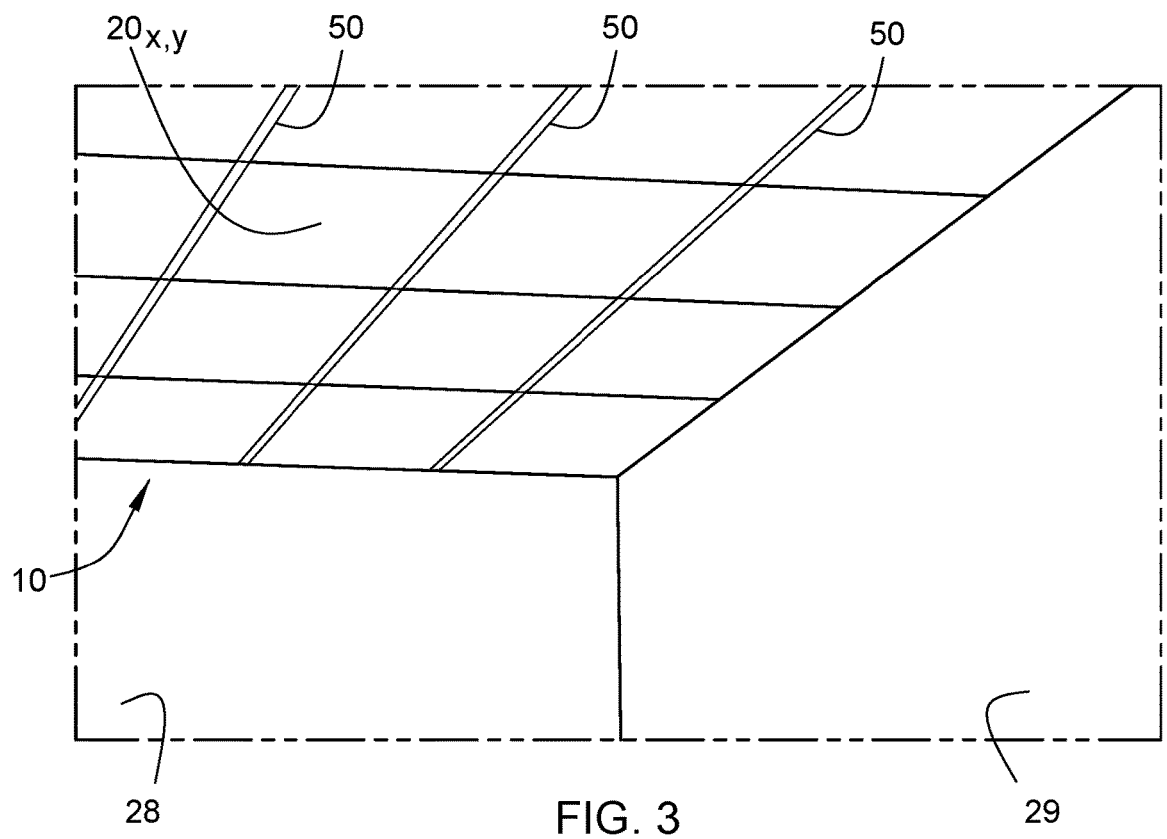
FIG. 3 is a perspective bottom view of a portion of a room having the walkable ceiling system of FIGS. 1 and 2.
Figure 4:
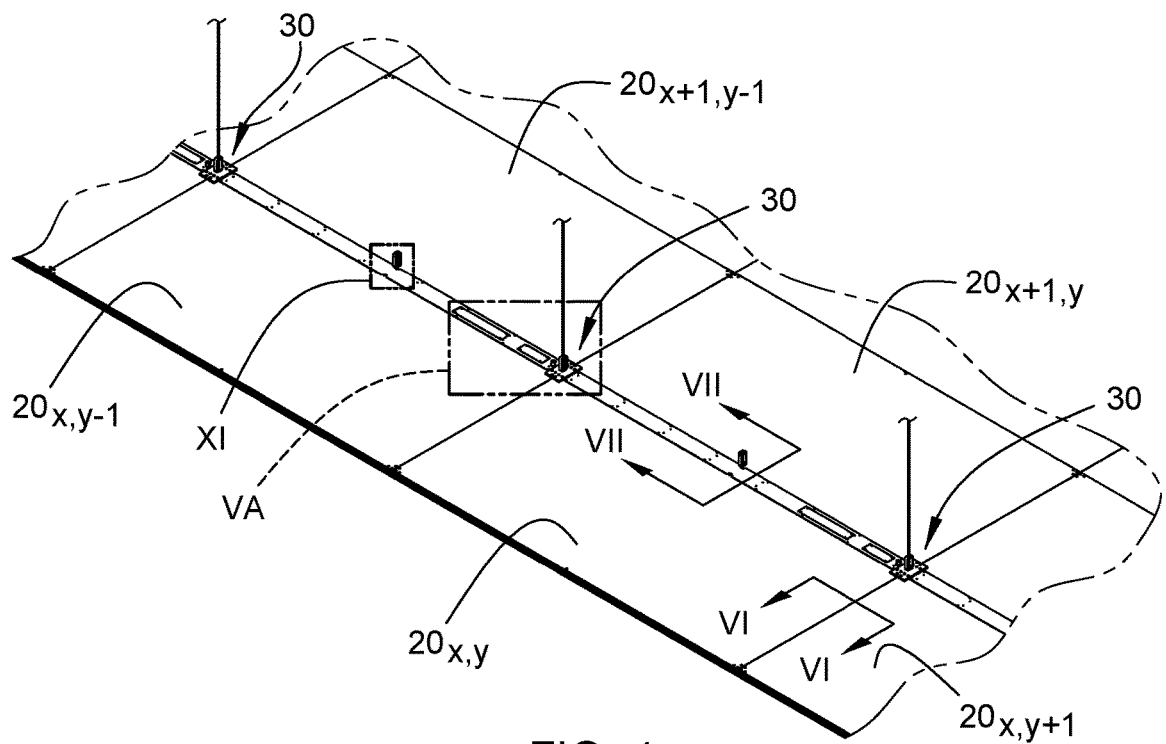
FIG. 4 is a top perspective view of a portion of the walkable ceiling system shown in FIGS. 1-3.

For purposes of description herein, the terms "upper," "lower," "right," "left," "rear," "front," "vertical," "horizontal," and derivatives thereof shall relate to the disclosure as oriented in FIG. 3. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a. . ." does not, without more constraints, preclude the existence of additional identical elements in the process, method, article, or apparatus that comprises the element.

Figure 2:
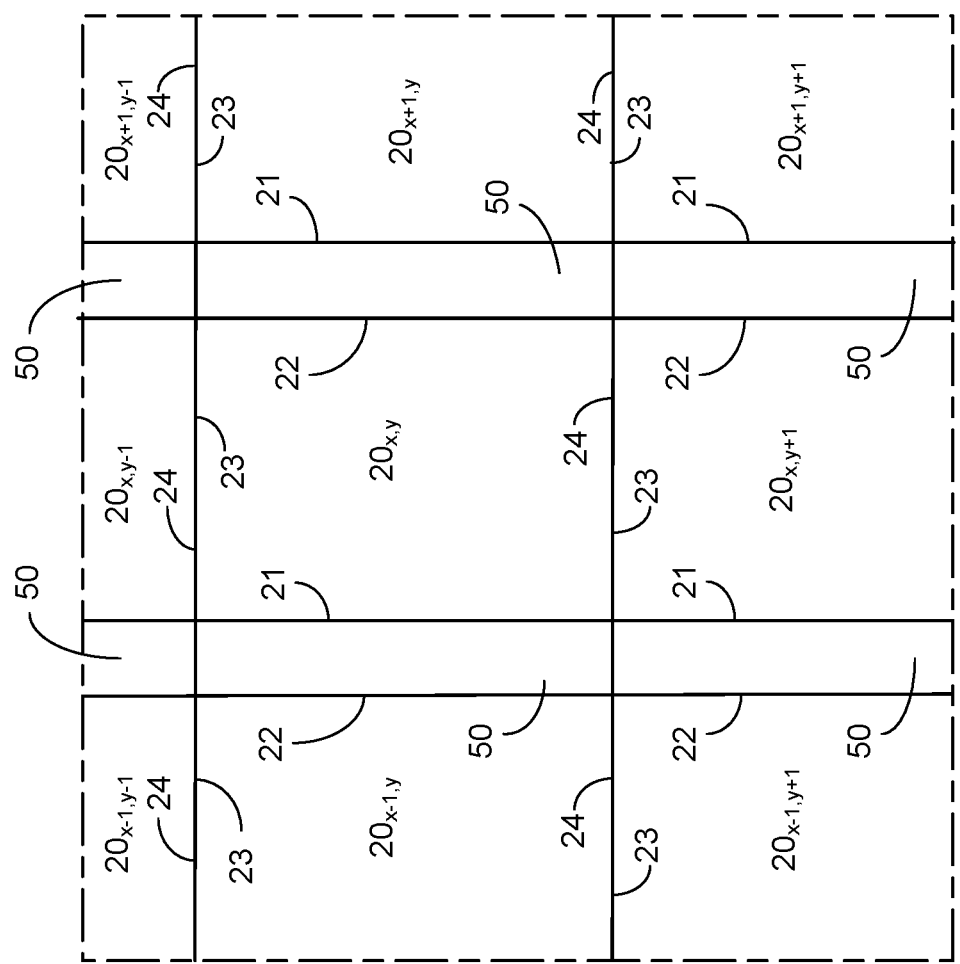
FIG. 2 is an enlarged bottom view of a portion of a walkable ceiling system such as shown in FIG. 1.

According to one embodiment illustrated in FIG. 1, a walkable ceiling system 10 is provided including a plurality of ceiling panels $20_{1,1}$-$20_{x,y}$ arranged in a grid pattern. FIG. 2 shows an enlarged view of a random portion of the ceiling system 10 of FIG. 1. As shown in FIG. 2, each ceiling panel has opposed first and second edges 21 and 22, and opposed third and fourth edges 23 and 24. As shown in FIG. 2, when the plurality of ceiling panels $20_{1,1}$-$20_{x,y}$ are arranged in the grid pattern, the third edge 23 of a ceiling panel $20_{x,y+1}$ abuts the fourth edge 24 of an adjacent ceiling panel $20_{x,y}$ and the first edge 21 of a ceiling panel $20_{x+1,y}$ is parallel to and spaced apart from the second edge 22 of the adjacent ceiling panel $20_{x,y}$. In this example, X represents the total number of rows of the grid pattern, Y represents the total number of columns, x can be any integer between 1 and X, and y can be any integer between 1 and Y. As shown in FIG. 3, walls 28 and 29 may be disposed under the ceiling system 10.

Figure 11:
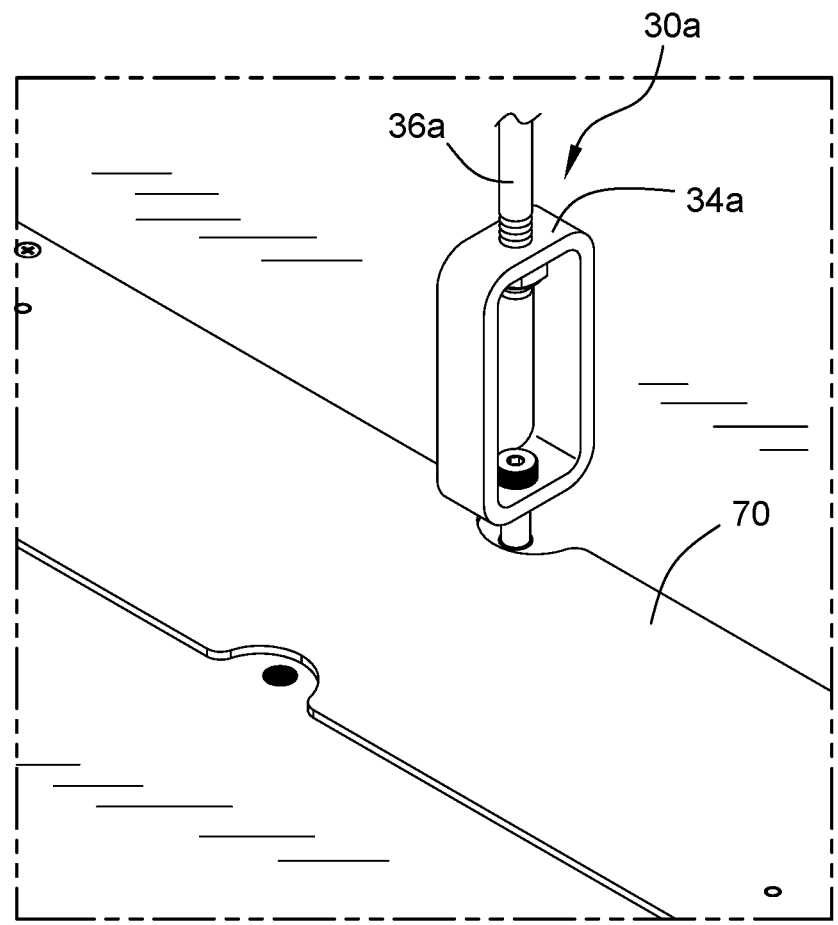
FIG. 11 is a top perspective view of a portion of the ceiling system having an auxiliary turnbuckle assembly.

As shown in FIGS. 4, 5A-5E, 7, and 9, the walkable ceiling system 10 may further include a plurality of turnbuckle assemblies 30 each having a steel plate 32 secured to corners of four adjacent ceiling panels, and a turnbuckle 34 secured to the plate 32 for attachment to a hanger 36 for suspending the ceiling panels $20_{1,1}$-$20_{x,y}$. The plates 32 serve to not only secure adjacent ceiling panels to one another, but also to provide for the suspension of the ceiling panels. The corners of the panels $20_{1,1}$-$20_{x,y}$ are secured to the plates 32 with bolts. The plates 32 are suspended from the structure above the ceiling 10 via the turnbuckles 34 and the hangers 36, which may be threaded rods. Further, auxiliary turnbuckle assemblies 30a (FIGS. 7, 8, and 11) may be provided that may be connected to an edge of a ceiling panel somewhere along its length at an intermediate location relative to its corners. The auxiliary turnbuckle assemblies 30a may include a turnbuckle 34a and a hanger 36a similar to the turnbuckle 34 and hanger 36 of turnbuckle assemblies 30. The auxiliary turnbuckle assemblies 30a may be provided to enhance the amount of weight the walkable ceiling system may bear and/or to provide extra support for ceiling panels with large cutouts. These large cutouts are typical in clean room applications for filters, HVAC applications, etc. The term "walkable ceiling system" means that the ceiling system and its hanging supports are capable of supporting the weight of at least two maintenance personnel simultaneously at any location including on an unmodified 5'×10' panel.

The ceiling panels $20_{x,y}$ of the walkable ceiling system 10 may have any construction or may be made of any suitable materials. In one example, the ceiling panels $20_{x,y}$ may be comprised of multiple composite panels that are constructed of honeycomb core bonded to steel skins. The panels are bordered by rigid metal extrusions. The ceiling panels $20_{x,y}$ may have any dimension and may be 10'×5' rectangles with a 3" gap between panels along the length.

The walkable ceiling system 10 may further include a plurality of light fixtures 50 positioned between the first edge 21 of a ceiling panel $20_{x+1,y}$ and the second edge 22 of an adjacent ceiling panel $20_{x,y}$. Each light fixture 50 may include: a lens 60 attached to the first edge 21 of a ceiling panel $20_{x+1,y}$ and the second edge 22 of an adjacent ceiling panel $20_{x,y}$ at a location proximate bottom surfaces of the ceiling panels; a top plate 70 secured to upper surfaces of adjacent ceiling panels to thereby secure adjacent ceiling panels to one another; a wiring raceway 80 attached to a bottom surface 72 (FIG. 5E) of the top plate 70; and light sources 90 attached to a bottom surface 82 of the wiring raceway 80 for projecting light from the gap between adjacent panels through the lens 60. The light sources 90 may be LEDs and may be preassembled to the bottom surface 82 of the raceway 80. Although the light sources 90 are described herein as LEDs, they may be any other type of light source. After the ceiling panels are suspended by the turnbuckle assemblies 30, the top portion of the light fixture 50 including the top plate 70, wiring raceway 80, and the light sources 90 and any LED driver circuitry 85 (FIG. 5B) may be dropped from above into the gap between adjacent ceiling panels and the top plate 70 of the light fixture 50 and is secured to the adjacent ceiling panels with screws to thereby assist in further securing the ceiling panels to one another. The top plates 70 have a thickness sufficient to support the weight of a person and yet not so thick as to present a tripping hazard.

Figure 5A:
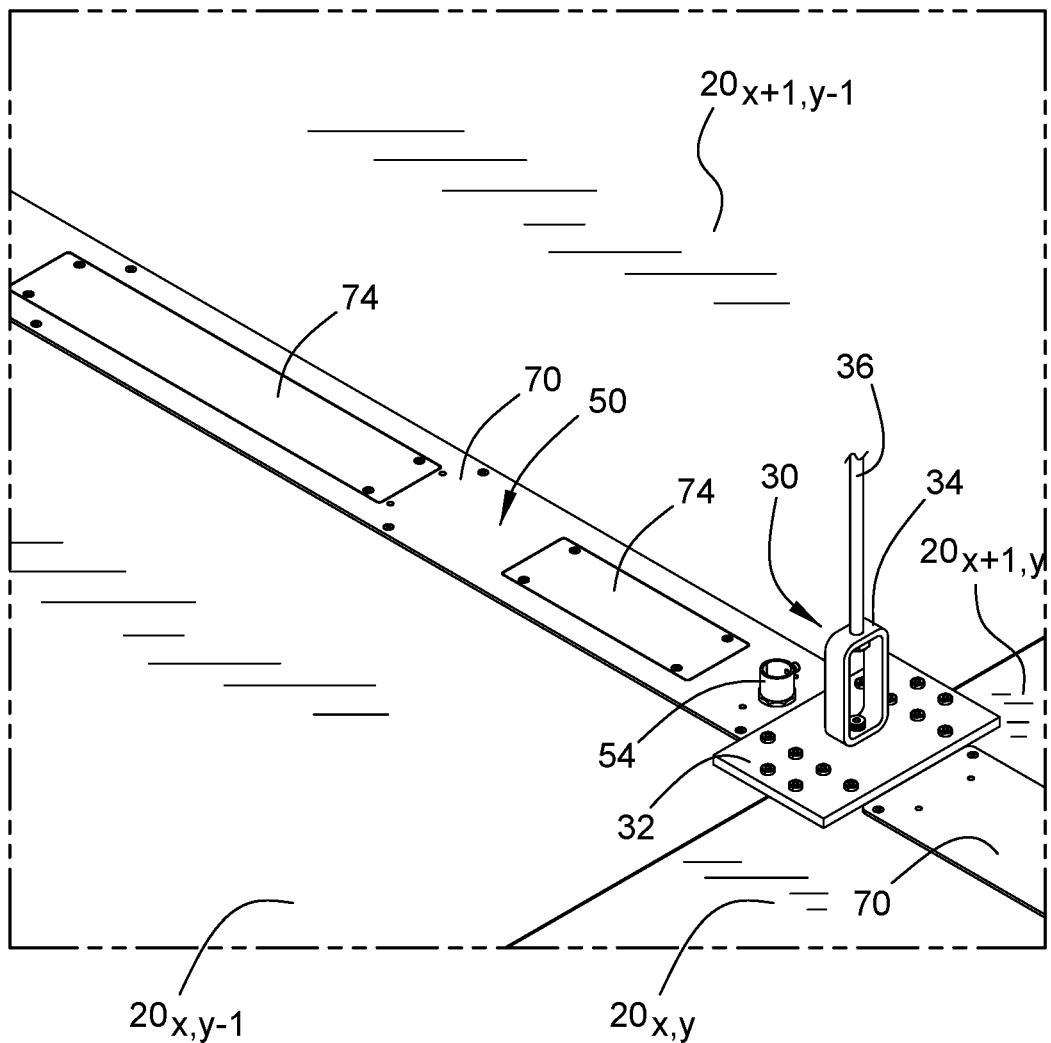
FIG. 5A is a close up top perspective view of the region VA designated in FIG. 4.
Figure 5B:
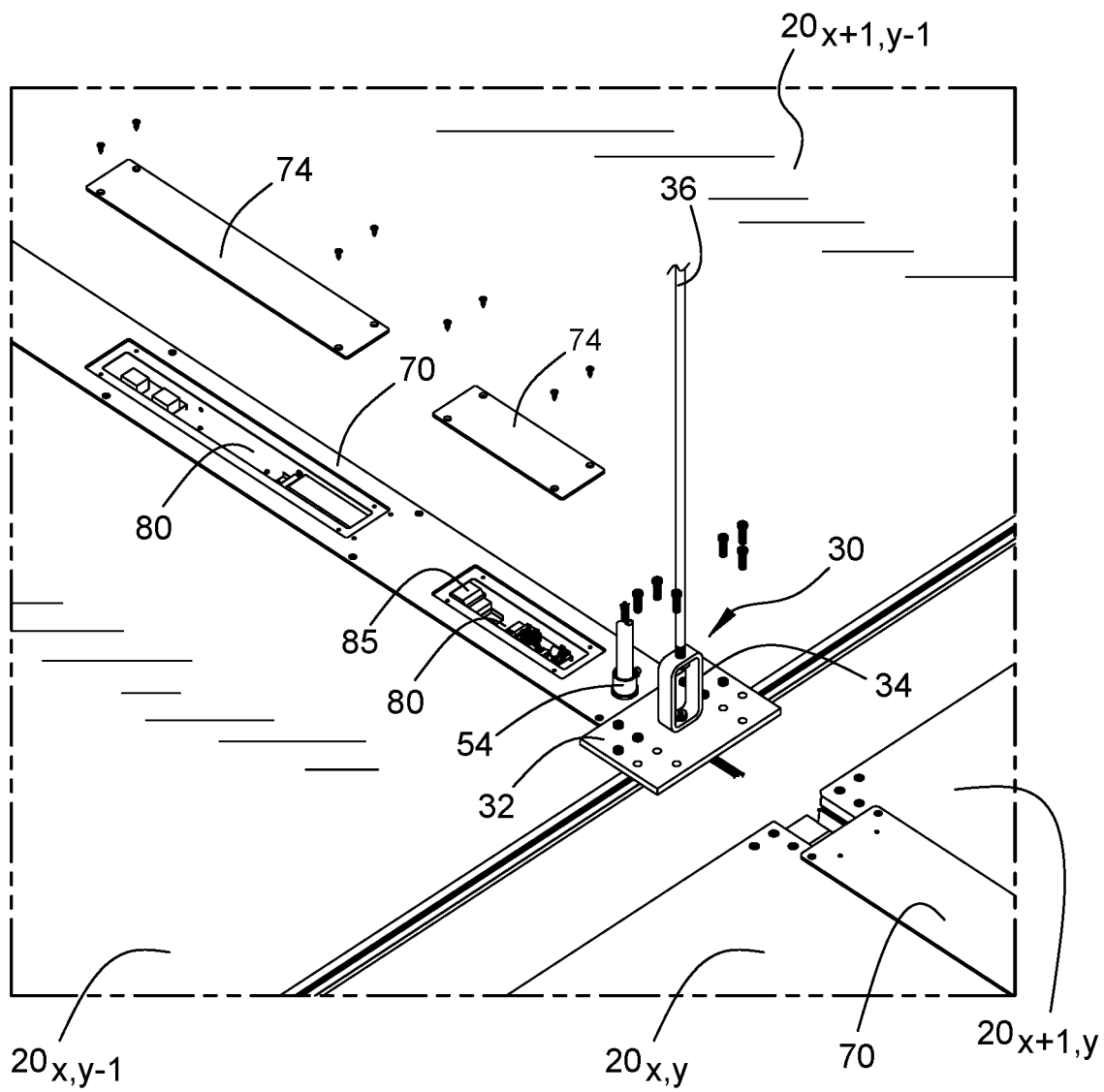
FIG. 5B is an exploded close up top perspective view of the region VA designated in FIG. 4 and shown in FIG. 5A.
Figure 5C:
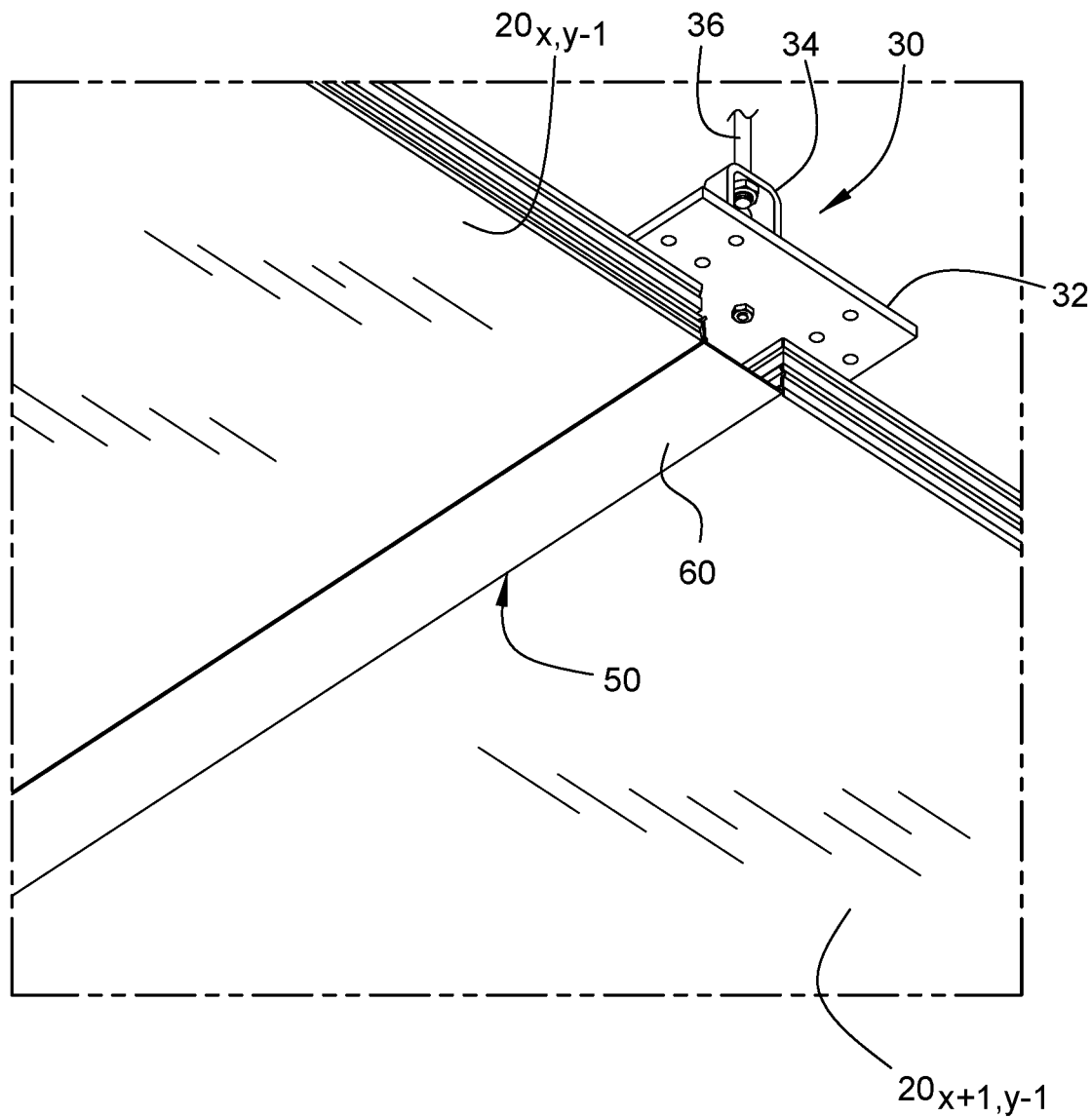
FIG. 5C is a close up bottom perspective view of the region of the walkable ceiling system shown in FIGS. 5A and 5B.
Figure 5D:
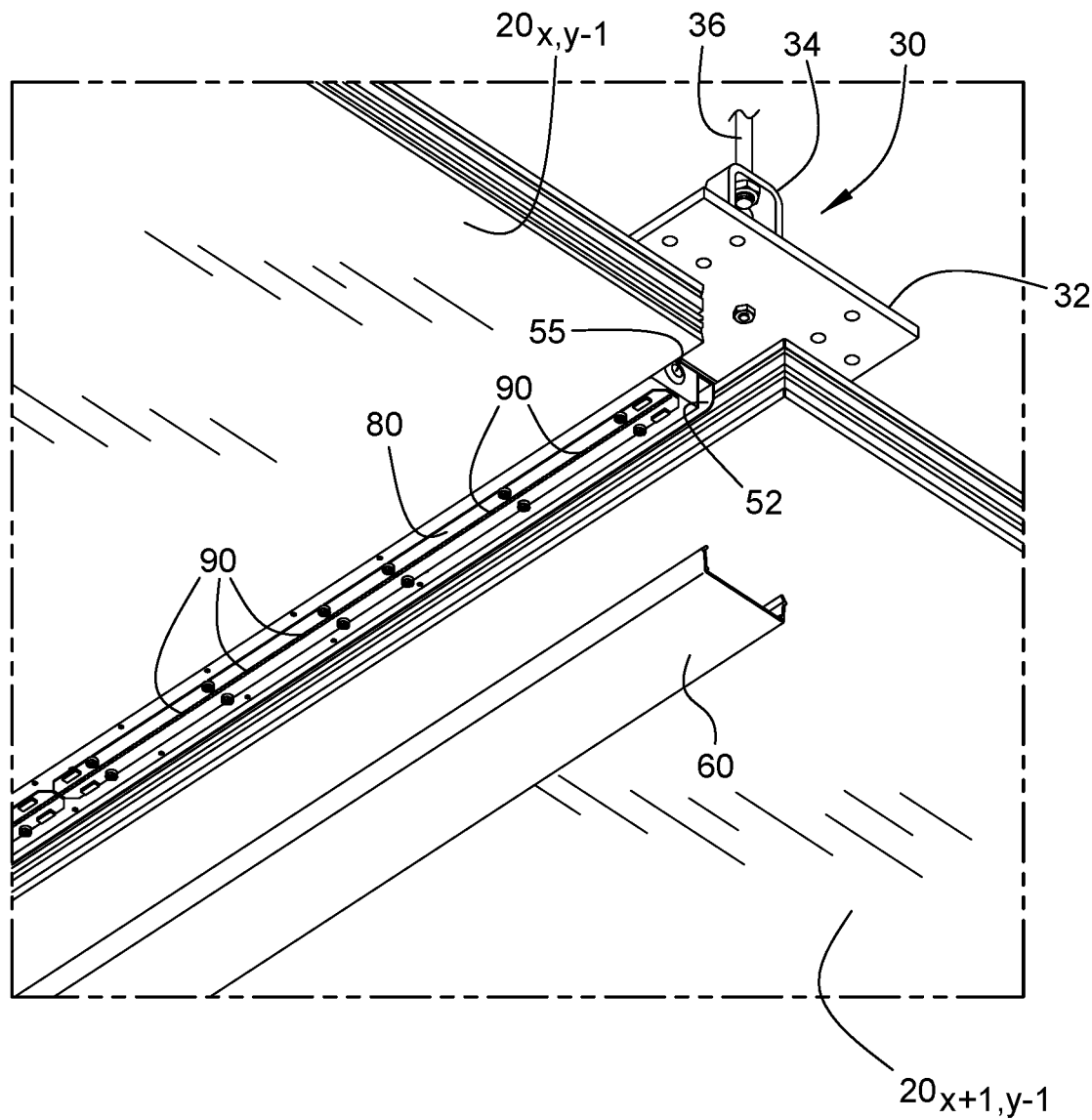
FIG. 5D is a partially exploded close up bottom perspective view of the region of the walkable ceiling system shown in FIGS. 5A-5C.
Figure 5E:
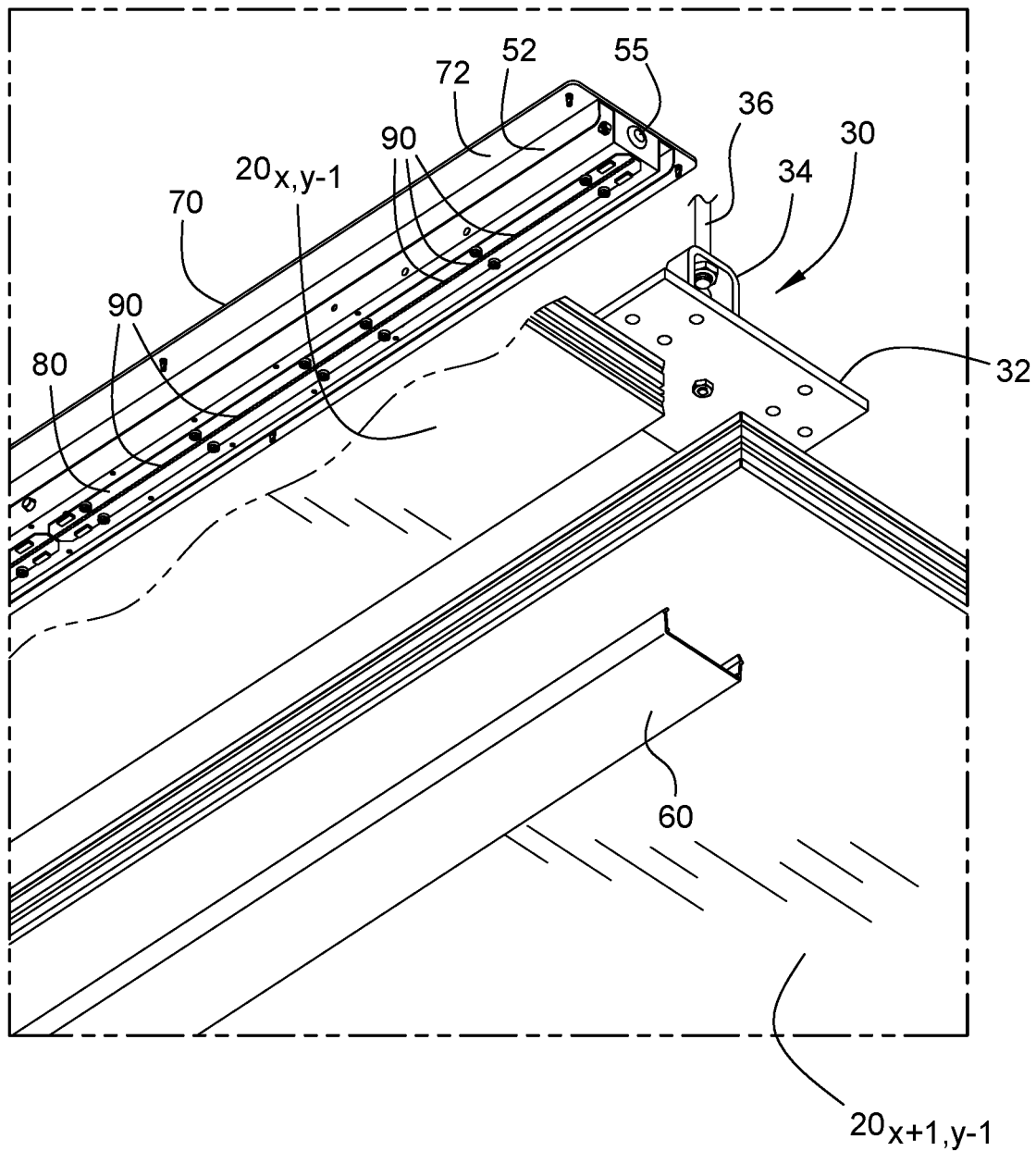
FIG. 5E is an exploded close up bottom perspective view of the region of the walkable ceiling system shown in FIGS. 5A-5D.

As best shown in FIG. 5B, each light fixture 50 may have at least one access panel 74 formed in the top plate 70 to allow access to the wiring raceway 80 and LED drivers 85 through the top plate 70. The LED drivers 85 can also be removed and replaced through the access panel 74.

Each of the plurality of light fixtures 50 may abut another of the plurality of light fixtures to provide a continuous line of light fixtures 50 along a length and/or width of the ceiling system 10 (FIG. 3). Adjacent lenses 60 may be joined by a lens doubler 66 (FIGS. 8-10) that snaps into respective bosses 66a and 66b. The lens doubler 66 aligns each lens 60 to the next, allowing them to be caulked together. Prior art lenses are not contiguous and are limited to less than fixture length and thus must utilize a clip in the panel. The lens 60 used herein may run the entire length of the room.

Figure 7:
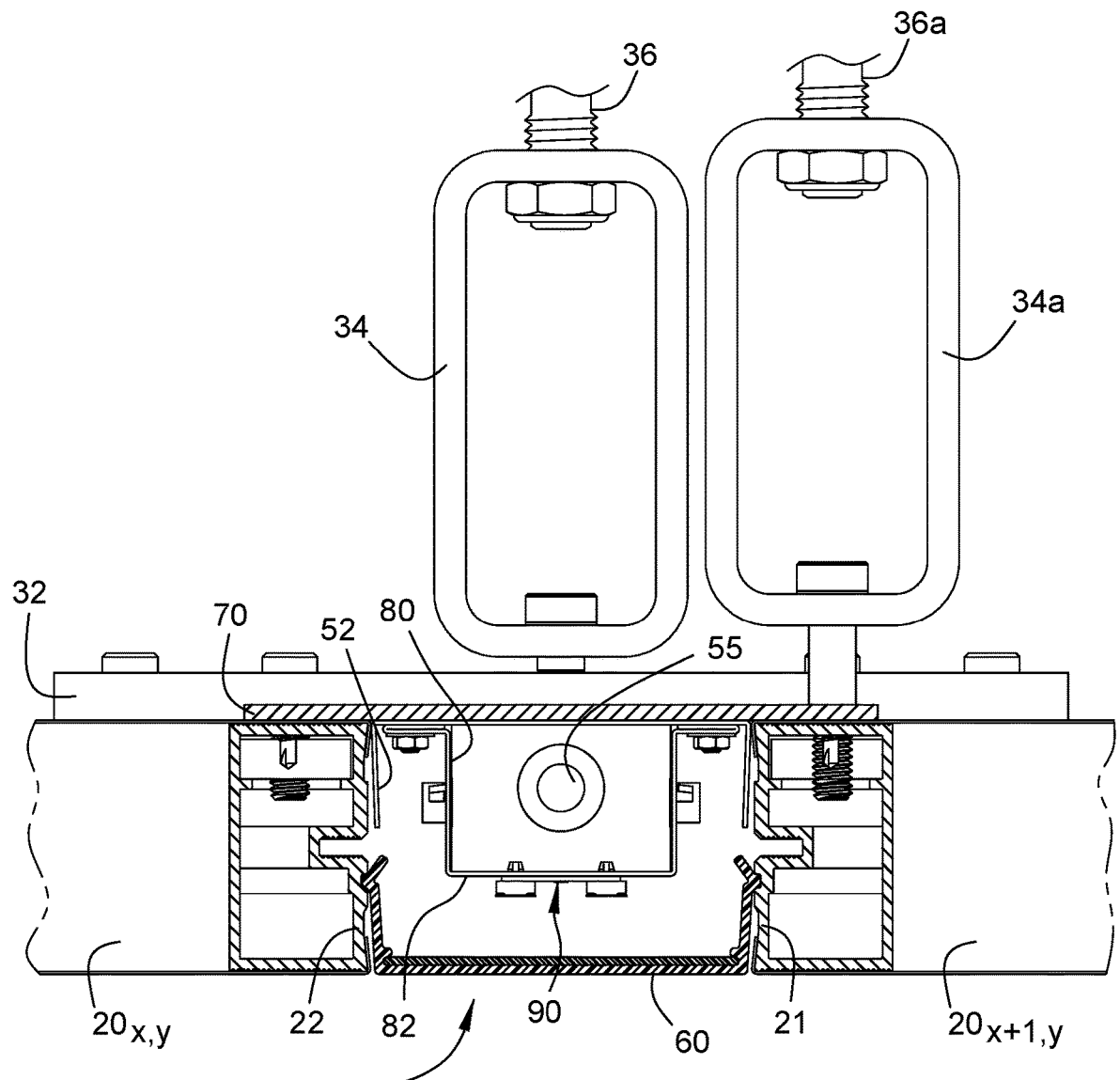
FIG. 7 is a cross-sectional view of the walkable ceiling system shown in the preceding drawings taken along line VII-VII in FIG. 4.
Figure 8:
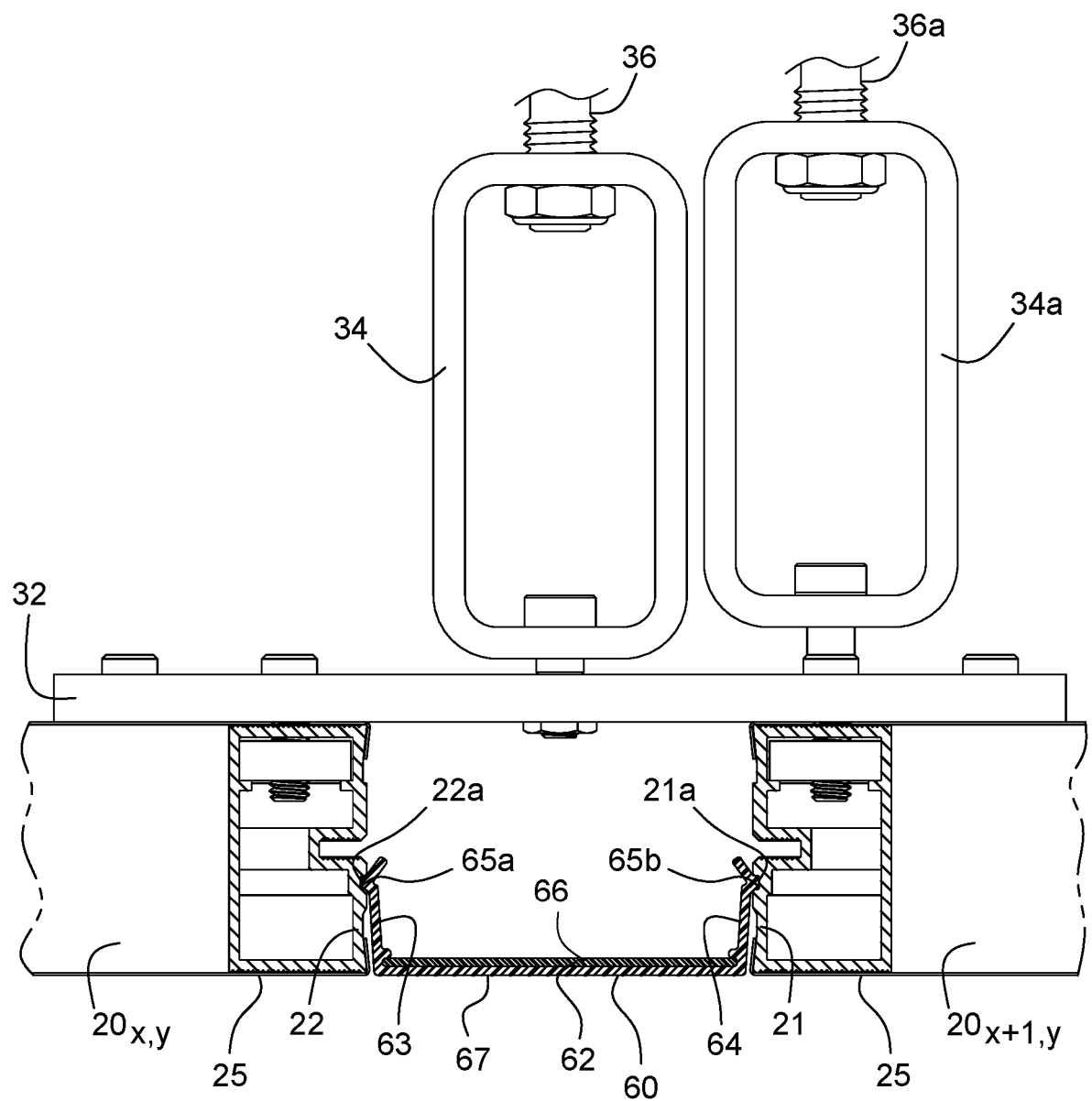
FIG. 8 is a cross-sectional view of the walkable ceiling system shown in the preceding drawings taken along line VII-VII in FIG. 4 with the upper portion of the light fixture removed.
Figure 9:
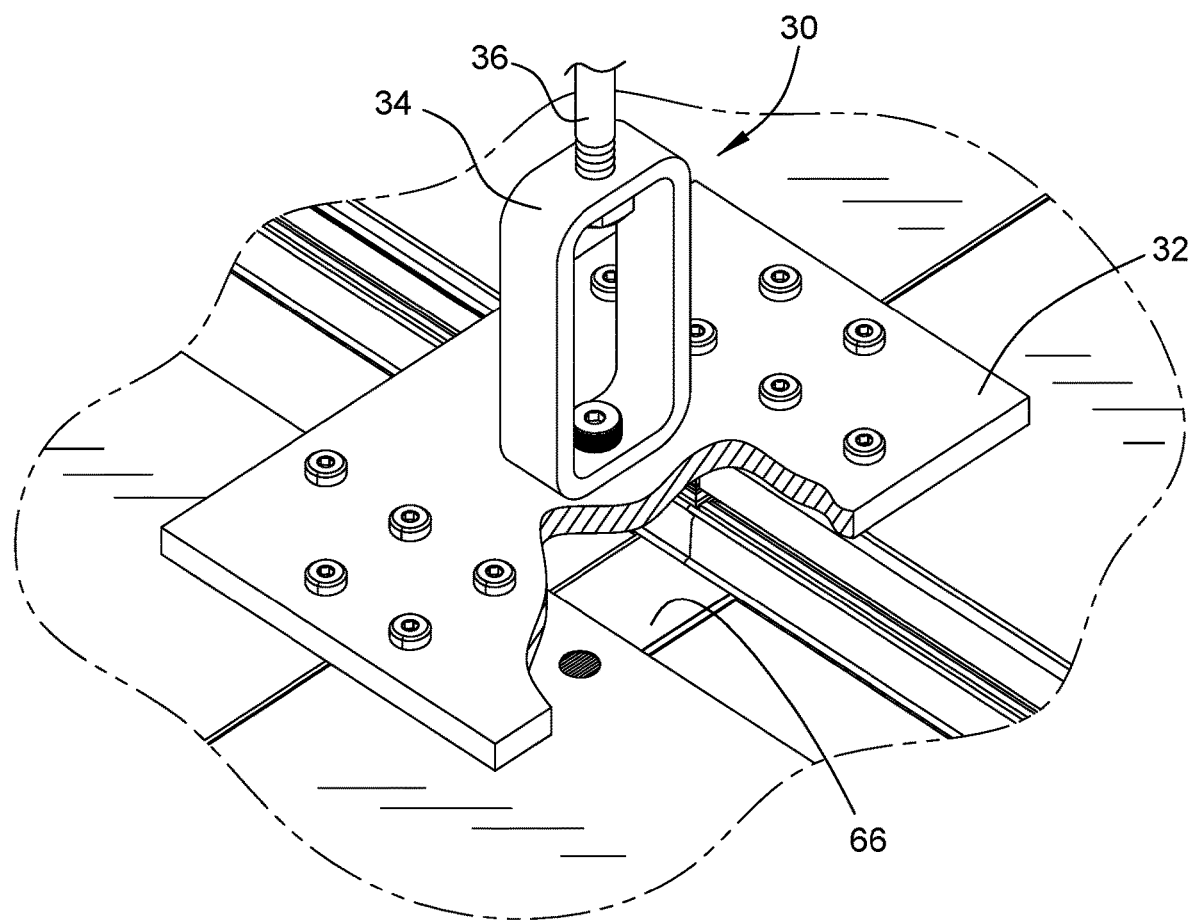
FIG. 9 is an enlarged close up top perspective view of the region IX designated in FIG. 4.
Figure 10:
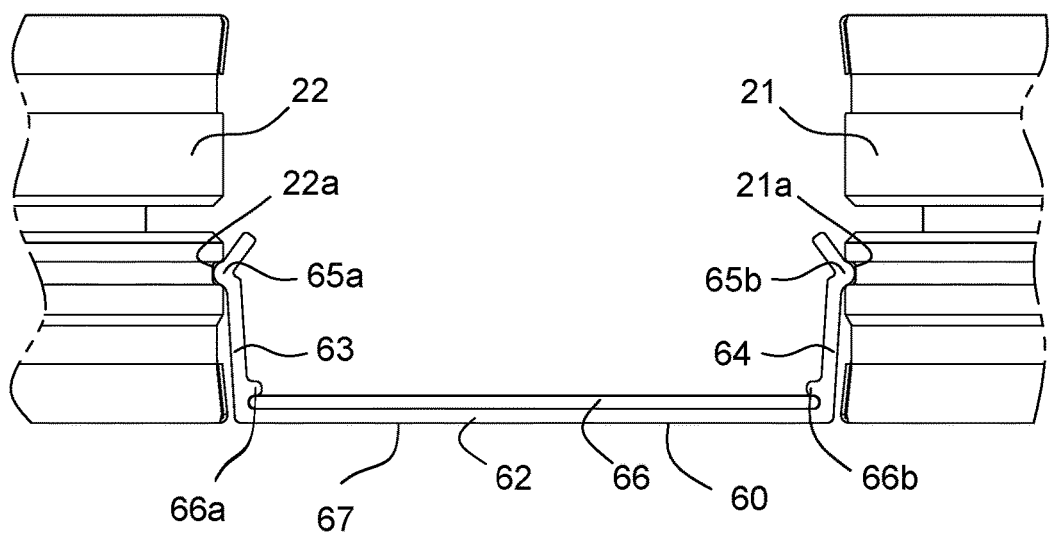
FIG. 10 is a partial cross-sectional view of the walkable ceiling system shown in the preceding drawings taken along line VII-VII in FIG. 4 with the upper portion of the light fixture removed and the turnbuckle assembly removed.

As best shown in FIGS. 7, 8, and 10, the lens 60 of each light fixture 50 includes a horizontal member 62 and a pair of opposing resilient sides 63 and 64 extending upward from the horizontal member 62. The pair of opposing resilient sides 63 and 64 including a first resilient side 64 configured for attachment to the first edge 21 of a ceiling panel $20_{x+1,y}$ and a second resilient side 63 configured for attachment to the second edge 22 of an adjacent ceiling panel $20_{x,y}$, the horizontal member 62 may be flush with the bottom surfaces 25 of the ceiling panels $20_{x+1,y}$ and $20_{x,y}$. As shown in FIG. 8, the first and second resilient sides 63 and 64 each include a tongue 65a and 65b, respectively, and the first and second edges 21 and 22 of each ceiling panel include a groove 21a and 22a for receiving a corresponding tongue 65b and 65a. In this way, the lens 60 may snap into place between adjacent ceiling panels. A bottom surface 67 of the horizontal member 62 may be flush with the bottom surface 25 of the adjacent ceiling panels $20_{x+1,y}$ and $20_{x,y}$. The space between the lens 60 and the edges 21 and 22 of adjacent ceiling panels may be sealed with a bead of caulk to provide an airtight ceiling system 10 suitable for use in a clean room. Thus, the ceiling, and hence the room, can be sealed by installing the lens 60, even if the rest of the light fixture 50 is not installed yet. This allows the clean room to be completely sealed before the upper portion of the light fixtures are installed. If one wishes to access the interior components of the light fixture 50, the caulk may be removed and then the lens 60 may be removed without requiring removal of the top portion of the light fixture or access from above the ceiling system 10. Alternatively, the light fixture 50 may be serviced from the top by removal of the access panels 74 without requiring removal of the seal or the lens 60. In addition, portions or the entirety of the light fixture 50 without the lens 60 can be removed and replaced from the top by removing the top plate 70 without disassembling the ceiling system 10 or removing the lens 60 thereby allowing diagnostics to be performed on the light fixture while the clean room remains in operation. This is a significant improvement over prior art "progressive ceiling systems" that require replacement of the light fixture from below the ceiling system with disassembly of the ceiling system insofar as such light fixtures function to hold adjacent ceiling panels together. As used herein, "progressive ceiling systems" mean the ceiling system would need to be disassembled in order to uninstall the light fixture as it is integral to the ceiling system, whereas a "non-progressive ceiling system" such as the one described herein, does not require such disassembly.

The lens 60 may be an extruded clear or translucent plastic or may be formed to have opaque regions where light is not desired to be emitted. By extruding the lens 60, lenses of varying lengths may be easily constructed. Because the lens 60 may be removed and replaced without requiring removal of the rest of the light fixture 50, one may replace the lenses 60 with other lenses having opaque regions to obtain the desired lighting patterns. Thus, the lighting within a room may be modified without requiring replacement of entire light fixtures 50.

Figure 6:
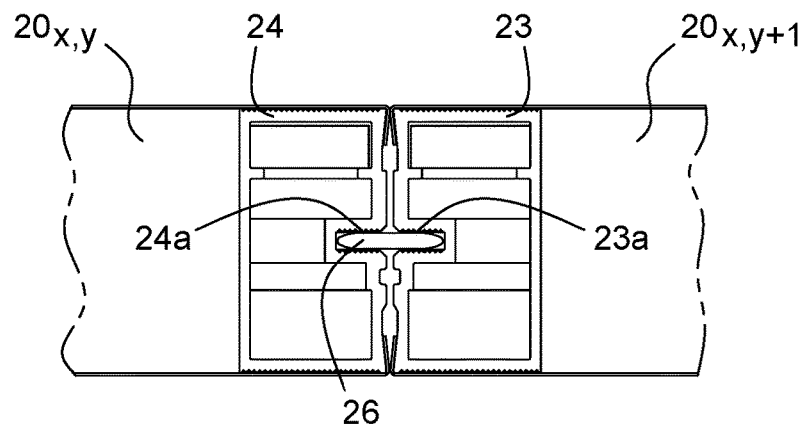
FIG. 6 is a cross-sectional view of the walkable ceiling system shown in the preceding drawings taken along line VI-VI in FIG. 4.

FIG. 6 shows a third edge 23 of a ceiling panel $20_{x,y+1}$ coupled to a fourth edge 24 of an adjacent ceiling panel $20_{x,y}$. One or more splines 26 can be inserted into corresponding grooves 23a and 24a in respective edges 23 and 24 in order to provide additional support along the widths of the ceiling panels.

The light fixture 50 may further include an inverted U-channel 52 (FIGS. 5D, 5E, and 7) attached between the top plate 70 and the wiring raceway 80 for acting as an alignment guide and a heat sink. The light fixture 50 may further include an electrical conduit adaptor 54 (FIG. 5B) provided on the top plate 70 to allow for external power to be provided to the wiring raceway 80. The light fixture 50 may include a knock-out (not shown) in which the electrical adaptor 54 may be installed. Further, another knock-out or a conduit plug 55 (FIGS. 5D, 5E, and 7) may be provided at the end of each wiring raceway 80 to allow wiring to be run to adjacent light fixtures 50.

Although light fixtures 50 are shown between the longer edges 21 and 22 of all ceiling panels, the light fixtures 50 may alternatively be located between the shorter edges 23 and 24. Further, because of the significant light output from each light fixture 50, the fixtures could be placed between every other ceiling panel instead of placed between every ceiling panel with separations of virtually any distance. If the light fixtures 50 are placed in 3" gaps between adjacent ceiling panels, the shadow length at the joints may be shortened compared to prior art designs of 12" widths.

The current design is highly configurable. The light fixtures can be made of a standard length (such as 10' or 5') and a shorter light length may be achieved with partially opaque lenses or disconnecting some of the light sources.

A method of assembling the walkable ceiling system 10 in a building structure includes the steps of providing a plurality of ceiling panels $20_{1,1}$-$20_{X,Y}$ each having opposed first and second edges 21 and 22 and opposed third and fourth edges 23 and 24 and providing a plurality of turnbuckle assemblies 30 each having a plate 32 and a turnbuckle 34 secured to the plate 32 for attachment to a hanger 36 that is suspended from the building structure. According to the method, the next step is attaching the plates 32 of some of the turnbuckle assemblies 30 to each corner of one of the ceiling panels $20_{1,1}$. The one ceiling panel $20_{1,1}$ is then suspended from the building structure by connecting the hangers 36 to the attached turnbuckle assemblies 30. The next step is attaching adjacent ceiling panels $20_{1,2}$ and $20_{2,1}$ to the plates 32 of the turnbuckle assemblies 30 and suspending the adjacent ceiling panels $20_{1,2}$ and $20_{2,1}$. Then the method includes continuing to attach and hang the ceiling panels $20_{1,3}$-$20_{X,Y}$ such that the plurality of ceiling panels $20_{1,1}$-$20_{X,Y}$ are suspended and arranged in a grid pattern whereby the third edges 23 of the ceiling panels abut the fourth edges 24 of adjacent ceiling panels and the first edges 21 of the ceiling panels are parallel to and spaced apart from the second edges 22 of adjacent panels, and such that each plate 32 of the turnbuckle assemblies 30 is attached to the corners of four adjacent ceiling panels with the exception of any ceiling panels along the edges of the room, in which case the plates may be attached to only one or two ceiling panels.

The method further includes providing a plurality of light fixtures 50. After the ceiling panels $20_{1,1}$-$20_{X,Y}$ are suspended, attaching the light fixtures 50 between the first edges 21 of the ceiling panels and the second edges 24 of the adjacent ceiling panels. This method is novel and advantageous in that the ceiling panels $20_{1,1}$-$20_{X,Y}$ may be hung in a walkable construction and the light fixtures may be installed after the ceiling panels $20_{1,1}$-$20_{X,Y}$ are all hung. The prior art methods are typically progressive in that the light fixture must be installed simultaneously with the ceiling, which makes it hard to fix mistakes. Moreover, the prior art "progressive" installation sequence necessitates that light fixtures with varying lengths have to be staged in the correct sequence to avoid stoppages in the installation of the ceiling.

As noted above, the light fixtures 50 each include an upper portion and a lens 60, the upper portion comprising a top plate 70, a wiring raceway 80 attached to the top plate 70, and a plurality of light sources 90 attached to the bottom of the wiring raceway 80. The step of attaching the light fixtures 50 includes first attaching the upper portions to the ceiling panels and subsequently attaching the lens 60 to the ceiling panels.

Although the ceiling system is described above as having the lens 60 being attached to the ceiling panels, the lens 60 may be configured to instead attach to a component of the upper portion of the light fixture 50, such as the inverted U-channel 52.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A walkable ceiling system comprising:
   a plurality of ceiling panels each having opposed first and second edges and opposed third and fourth edges, wherein the plurality of ceiling panels are arranged in a grid pattern such that the third edge of a ceiling panel abuts the fourth edge of an adjacent ceiling panel and the first edge of a ceiling panel is parallel to and spaced apart from the second edge of an adjacent panel;
   a plurality of turnbuckle assemblies each having a plate secured to corners of four adjacent ceiling panels, and a turnbuckle secured to the plate for attachment to a hanger for suspending the ceiling panels; and
   a plurality of light fixtures positioned between the first edge of a ceiling panel and second edge of an adjacent ceiling panel, each light fixture comprising:
      a lens attached between the first edge of a ceiling panel and second edge of an adjacent ceiling panel at a location proximate bottom surfaces of the ceiling panels;
      a top plate secured to upper surfaces of adjacent ceiling panels to thereby secure adjacent ceiling panels to one another;
      a wiring raceway attached to a bottom surface of the top plate; and
      a plurality of light sources attached to a bottom surface of the wiring raceway for projecting light from between adjacent panels through the lens.

2. The walkable ceiling system of claim 1, wherein the plurality of light fixtures each further comprise an access panel formed in the top plate to allow access to the wiring raceway through the top plate.

3. The walkable ceiling system of claim 1, wherein the lens of each of the plurality of light fixtures abuts the lens of another of the plurality of light fixtures to provide a continuous line of light fixtures along a length of the ceiling system.

4. The walkable ceiling system of claim 1, wherein the lens of each light fixture comprises a horizontal member and a pair of opposing resilient sides extending upward from the horizontal member, the pair of opposing resilient sides including a first resilient side configured for attachment to the first edge of a ceiling panel and a second resilient side configured for attachment to the second edge of an adjacent ceiling panel, the horizontal member extending flush with the bottom surfaces of the ceiling panels.

5. The walkable ceiling system of claim 4, wherein the first and second resilient sides include a tongue, and the first and second edges of each ceiling panel include a groove for receiving a corresponding tongue.

6. The walkable ceiling system of claim 1, wherein a bottom surface of the horizontal member is flush with the bottom of the adjacent ceiling panels.

7. The walkable ceiling system of claim 1, wherein the light fixtures are configured such that the top plate, wiring raceway, and light sources of each light fixture may be removed without removing the lens.

8. The walkable ceiling system of claim 1, wherein the light fixture further comprises a U-channel attached to between the top plate and the wiring raceway for acting as an alignment guide and a heat sink.

9. The walkable ceiling system of claim 1, wherein the light fixture further comprises knock-out provided on the top plate to allow for external power to be provided to the wiring raceway.

10. The walkable ceiling system of claim 1, wherein adjacent lenses are joined by a lens doubler.

11. The walkable ceiling system of claim 1, wherein the plurality of light fixtures are configured such that any of the lenses may be removed without removing a remaining portions of any of the plurality of light fixtures.

12. A walkable ceiling system comprising:
a plurality of ceiling panels each having opposed first and second edges and opposed third and fourth edges, wherein the plurality of ceiling panels are arranged in a grid pattern such that the third edge of a ceiling panel abuts the fourth edge of an adjacent ceiling panel and the first edge of a ceiling panel is parallel to and spaced apart from the second edge of an adjacent panel; and
a plurality of light fixtures positioned between the first edge of a ceiling panel and second edge of an adjacent ceiling panel, each light fixture comprising:
a lens attached to the first edge of a ceiling panel and second edge of an adjacent ceiling panel at a location proximate bottom surfaces of the ceiling panels;
a top plate secured to upper surfaces of adjacent ceiling panels;
a wiring raceway attached to a bottom surface of the top plate;
a plurality of light sources attached to a bottom surface of the wiring raceway for projecting light from between adjacent panels through the lens; and
an access panel formed in the top plate to allow access to the wiring raceway through the top plate.

13. The walkable ceiling system of claim 12, and further comprising a plurality of turnbuckle assemblies each secured to at least one of the ceiling panels for attachment to a hanger for suspending the ceiling panels.

14. The walkable ceiling system of claim 13, wherein the plurality of turnbuckle assemblies each having a plate secured to corners of four adjacent ceiling panels.

15. A light fixture for a walkable ceiling system having a plurality of ceiling panels each having opposed first and second edges and opposed third and fourth edges, wherein the plurality of ceiling panels are arranged in a grid pattern such that the third edge of a ceiling panel abuts the fourth edge of an adjacent ceiling panel and the first edge of a ceiling panel is parallel to and spaced apart from the second edge of an adjacent panel, the light fixture comprising:
a lens comprising a horizontal member and a pair of opposing resilient sides extending upward from the horizontal member, the pair of opposing resilient sides including a first resilient side configured for attachment to the first edge of a ceiling panel and a second resilient side configured for attachment to the second edge of an adjacent ceiling panel, the horizontal member extending flush with the bottom surfaces of the ceiling panels;
a top plate configured to be secured to upper surfaces of adjacent ceiling panels;
a wiring raceway attached to a bottom surface of the top plate; and
a plurality of light sources attached to a bottom surface of the wiring raceway for projecting light from between adjacent panels through the lens.

16. The light fixture of claim 15 and further comprising an access panel formed in the top plate to allow access to the wiring raceway through the top plate.

17. The light fixture of claim 15, wherein the lens does not touch the other components of the light fixture.

18. The light fixture of claim 15 and further comprising a U-channel attached to between the top plate and the wiring raceway for acting as an alignment guide and a heat sink.

19. The light fixture of claim 15 and further comprising adaptor knock-out provided on the top plate to allow for external power to be provided to the wiring raceway.

20. A method of assembling a walkable ceiling system, the method comprising:
providing a plurality of ceiling panels each having opposed first and second edges and opposed third and fourth edges;
providing a plurality of turnbuckle assemblies each having a plate and a turnbuckle secured to the plate for attachment to a hanger;
attaching the plates of some of the turnbuckle assemblies to corners of one of the ceiling panels;
suspending the ceiling panel by connecting the hangers to the attached turnbuckle assemblies;
attaching adjacent ceiling panels to the plates of the turnbuckle assemblies and suspending the adjacent ceiling panels;
continuing to attach and hang the ceiling panels such that the plurality of ceiling panels are suspended and arranged in a grid pattern whereby the third edges of the ceiling panels abut the fourth edges of adjacent ceiling panels and the first edges of the ceiling panels are parallel to and spaced apart from the second edges of adjacent panels, and such that each plate of the turnbuckle assemblies is attached to the corners of four adjacent ceiling panels;
providing a plurality of light fixtures; and
after the ceiling panels are suspended, attaching the light fixtures between the first edges of the ceiling panels and the second edges of the adjacent panels.

21. The method of claim 20, wherein the light fixtures each include an upper portion and a lens, the upper portion comprising a top plate, a wiring raceway attached to the top plate, and a plurality of light sources attached to the bottom of the wiring raceway, and wherein the step of attaching the light fixtures includes first attaching the upper portions to the ceiling panels and subsequently attaching the lens to the ceiling panels.

22. The method of claim 20, wherein the light fixtures each include an upper portion and a lens, the upper portion comprising a top plate, a wiring raceway attached to the top plate, and a plurality of light sources attached to the bottom of the wiring raceway, and wherein the step of attaching the light fixtures includes first attaching the lenses of the light fixtures to the ceiling panels and subsequently attaching the upper portions to the ceiling panels.

* * * * *